United States Patent [19]

Fuchigami

[11] Patent Number: 5,087,280
[45] Date of Patent: Feb. 11, 1992

[54] FLOATING MOLD CHANGER CARRIAGE

[75] Inventor: Yasuhiro Fuchigami, Osaka, Japan

[73] Assignee: Nippon Sheet Glass Co., Ltd., Osaka, Japan

[21] Appl. No.: 402,898

[22] Filed: Dec. 7, 1988

[30] Foreign Application Priority Data

Dec. 7, 1987 [JP] Japan .................. 62-308973

[51] Int. Cl.$^5$ .................. B60V 1/06; C03B 23/03
[52] U.S. Cl. .................. 65/171; 65/172; 180/119; 180/124; 180/125
[58] Field of Search .................. 65/171-173, 65/106, 273, 287; 180/124, 125, 116, 119

[56] References Cited

U.S. PATENT DOCUMENTS

| | | | |
|---|---|---|---|
| 3,457,874 | 7/1969 | Tezuka et al. | 180/125 |
| 3,618,694 | 11/1971 | Crowley | 180/124 |
| 3,807,035 | 4/1974 | Moorman et al. | 180/125 |
| 3,825,094 | 7/1974 | Burdick | 180/125 |
| 4,082,195 | 4/1978 | Wnek | 180/125 |
| 4,092,141 | 5/1978 | Frank et al. | 65/273 |
| 4,273,244 | 6/1981 | Jensen et al. | 180/125 |
| 4,711,654 | 12/1987 | Iida | 65/172 |

FOREIGN PATENT DOCUMENTS 2185974 8/1987 United Kingdom.

*Primary Examiner*—Joye L. Woodard
*Attorney, Agent, or Firm*—Merchant, Gould, Smith, Edell, Welter & Schmidt

[57] ABSTRACT

A floating mold changer carriage is movable between a shaping device for shaping a sheet of glass with at least one mold and a mold storage area spaced from the shaping device, for replacing the mold with a new mold. The carriage includes a main frame having a plurality of pallets mounted on a lower surface thereof and each having a flow passage with its one open end connected to fluid source. The pallet has a cylindrical portion on its lower surface and a hollow annular member of a resilient material disposed around the cylindrical portion. The annular member has an opening confronting the other open end of the flow passage. When a fluid or air is supplied from the fluid source via the flow passage into the annular members, the annular members are inflated to float the main frame off the floor. Continued supply of air develops a fluid or air layer between the floor and the annular members to lower the coefficient of friction therebetween, thus allowing the carriage to be moved easily.

6 Claims, 6 Drawing Sheets

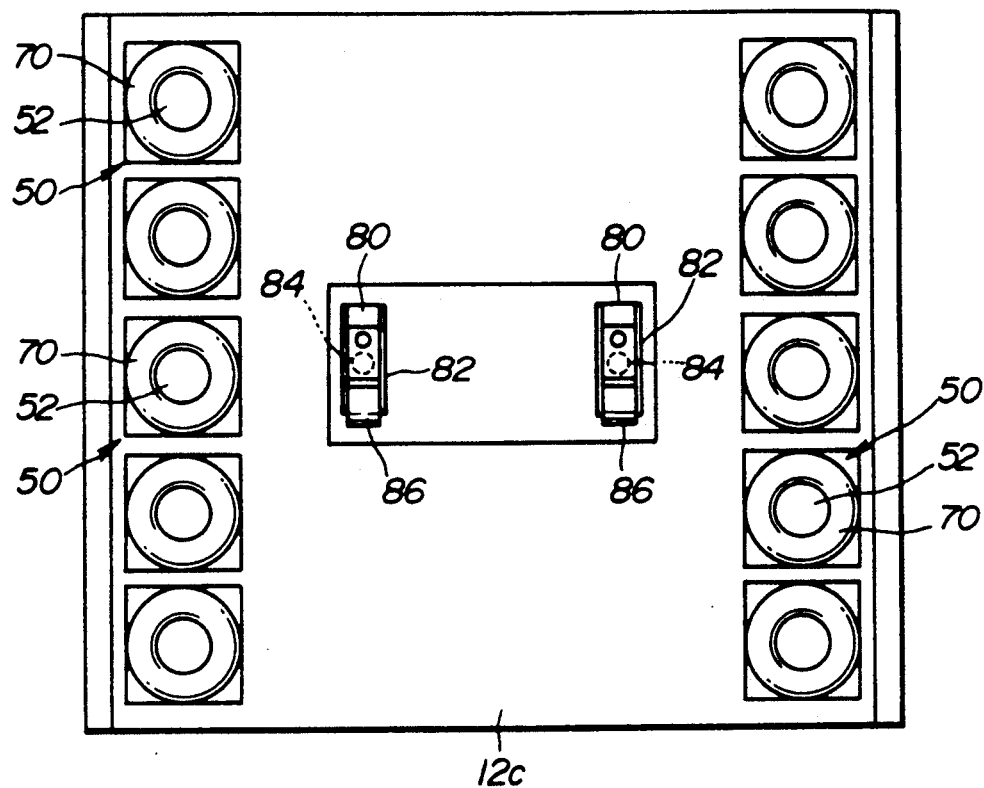
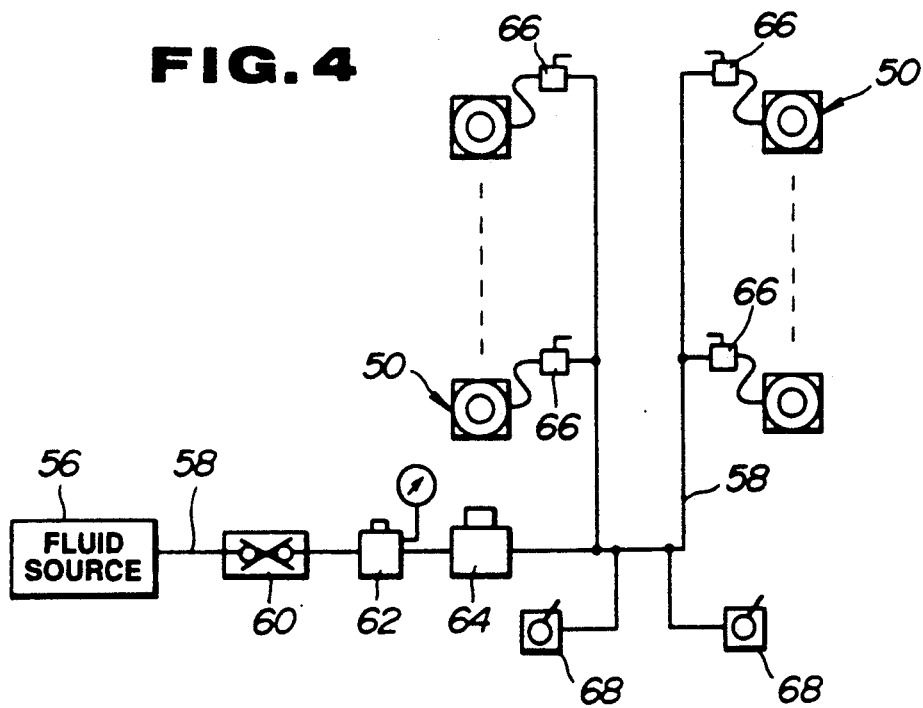

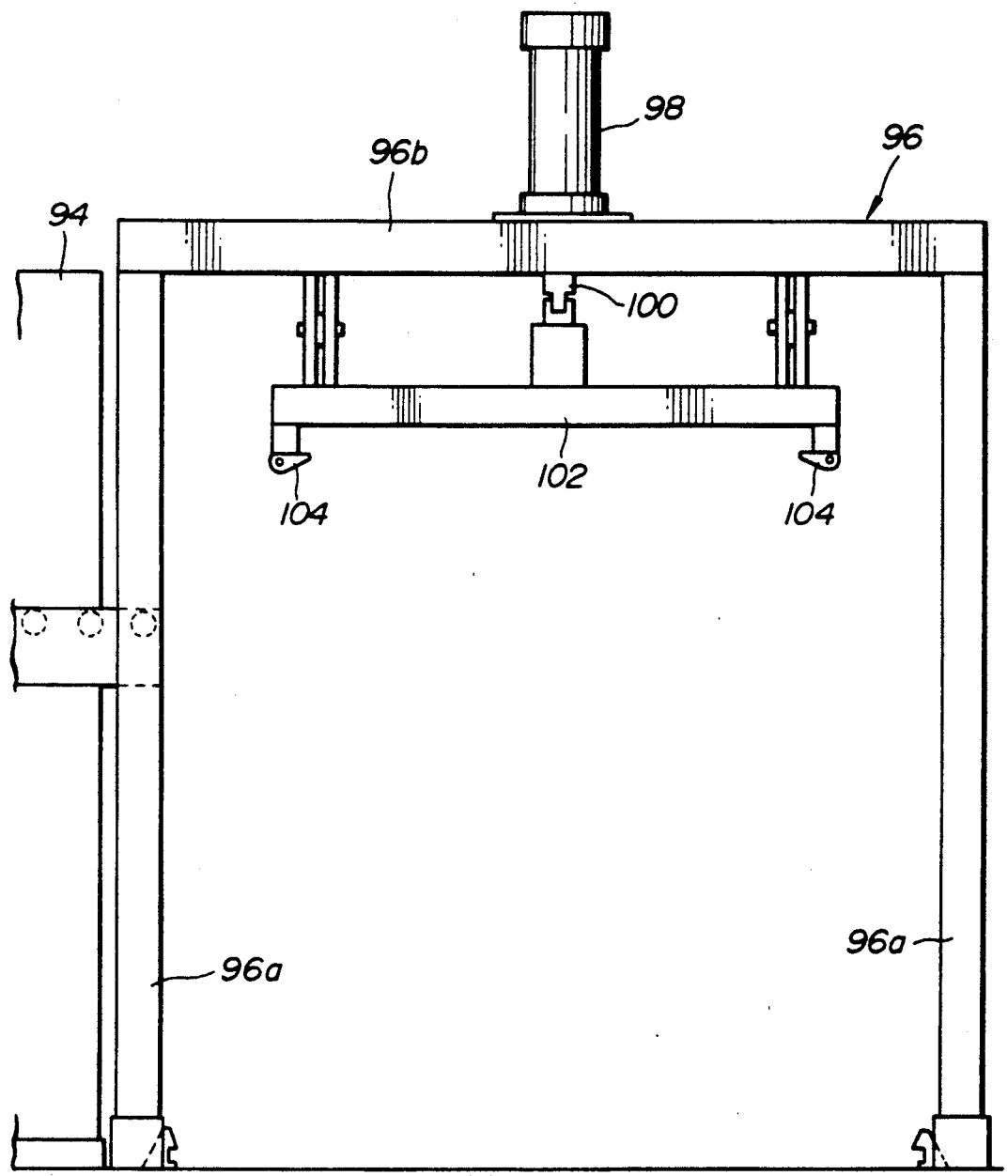

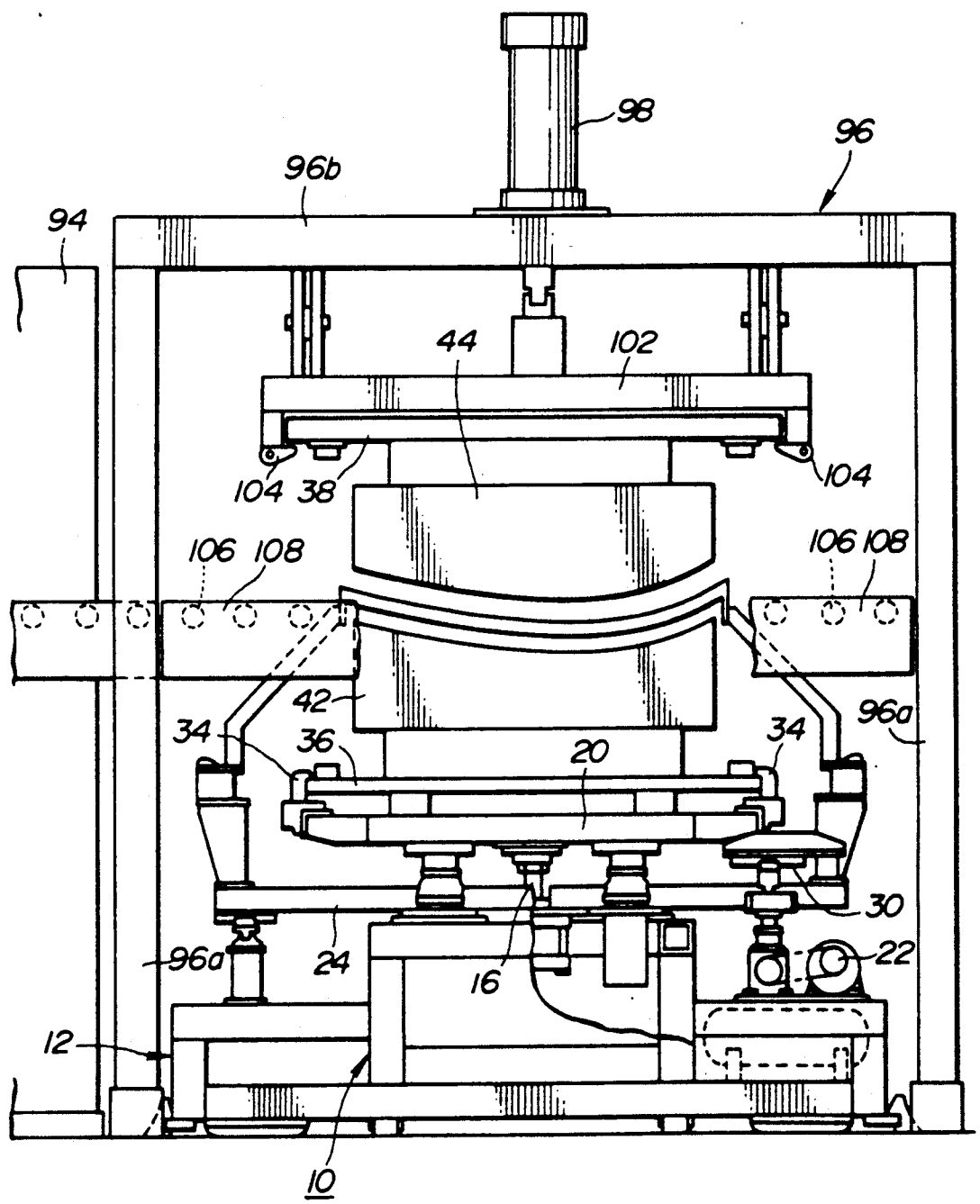

FLOATING MOLD CHANGER CARRIAGE

BACKGROUND OF THE INVENTION

1. Field of the Invention

The present invention relates to an apparatus for manufacturing curved sheets of glass with upper and lower molds, and more particularly to a mold changer carriage for changing such upper and lower molds altogether.

2. Description of the Relevant Art

Curved sheets of glass for use as automobile windshields, for example, are manufactured by an apparatus as disclosed in Japanese Patent Publication No. 53-12931, for example. The disclosed manufacturing apparatus has a heating furnace for heating a sheet of glass up to a temperature near its softening point. The heated glass sheet is delivered horizontally to a position between upper and lower molds of a shaping device by feed rollers. The glass sheet is then positioned between the upper and lower molds, and the lower mold is lifted above the feed rollers to place the glass sheet on the lower mold. Thereafter, the upper mold is lowered into pressing contact with the glass sheet on the lower mold for curving the glass sheet to a desired curved shape.

For manufacturing a differently curved glass sheet, the upper and lower molds in the shaping device are replaced with another set of upper and lower molds. The process of removing the existing molds from the shaping assembly and replacing them with new molds is however very complex and time-consuming. More specifically, the upper and lower molds are fixedly mounted on attachment plates fixed to lifting/lowering devices or hydraulic cylinders. In order to replace the upper and lower molds with new ones, they are detached from the respective attachment plates and delivered to a given storage area for storage. Then, a new upper mold stored in another storage area is carried into the shaping device, and lifted and attached to the attachment plate therefor, and a new lower mold is similarly delivered from the storage area into the shaping device and attached to the corresponding attachment plate. Thereafter, the upper and lower molds are registered with each other.

Japanese Laid-Open Patent Publication No. 62-182124 discloses a mold changer for use with an apparatus for manufacturing curved sheets of glass. The disclosed mold changer includes a carrier plate having a number of steel balls on its upper surface. Upper and lower attachment plates which are interconnected by positioning rods are placed on the carrier plate, the upper and lower attachment plates supporting upper and lower molds, respectively. By moving the carrier plate along rails, the upper and lower molds can simultaneously be moved between a shaping device and their storage location. Problems with this mold changer are that a wide floor space is needed for the installation of the rails, the mold changer itself tends to interfere with various other operations, and when large molds are to be replaced or used, considerably large forces are required to move the molds.

SUMMARY OF THE INVENTION

It is an object of the present invention to provide a floating mold changer carriage capable of easily carrying molds into and out of a shaping device.

According to the present invention, there is provided a floating mold changer carriage for movement between a shaping device for shaping a sheet of glass with at least one mold and a mold storage area spaced from the shaping device, for replacing the mold with a new mold, the floating mold changer carriage comprising a main frame, a fluid source for supplying a fluid, first means connected to the fluid source for discharging the fluid supplied from the fluid source, downwardly from a lower surface of the main frame; and second means coacting with the first means and inflatable for floating the main frame when the second means is supplied with the fluid therein.

In a preferred embodiment, the first means comprises a plurality of pallets attached to the lower surface of the main frame, each of the pallets having a flow passage defined therein and having one open end connected to the fluid source and the other open end opening toward a floor. The second comprises hollow annular members disposed around central cylindrical portions of the pallets, each of the annular members having an opening confronting the other open end of the flow passage. The fluid is air but may be water. When the fluid is supplied from the fluid source via the flow passage into the annular members, the annular members are inflated to float the entire carriage off the floor. The coefficient of friction between the floor and the annular members is lowered to allow the carriage to be moved with ease. A plurality of wheels are rotatably mounted on the lower surface of the main frame. By orienting the wheels in a desired direction, the direction of movement of the carriage can be controlled so as to prevent the carriage from being displaced laterally off the desired direction.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 3 is a bottom view of the floating carriage;

FIG. 4 is a schematic view of a fluid supply system for supplying a fluid to pallets of the floating carriage;

FIG. 7 is a front elevational view of a frame assembly of a shaping device; and

FIG. 8 is a front elevational view of the floating carriage which is positioned in the frame assembly illustrated in FIG. 7.

DETAILED DESCRIPTION OF THE PREFERRED EMBODIMENT

Figure 1:
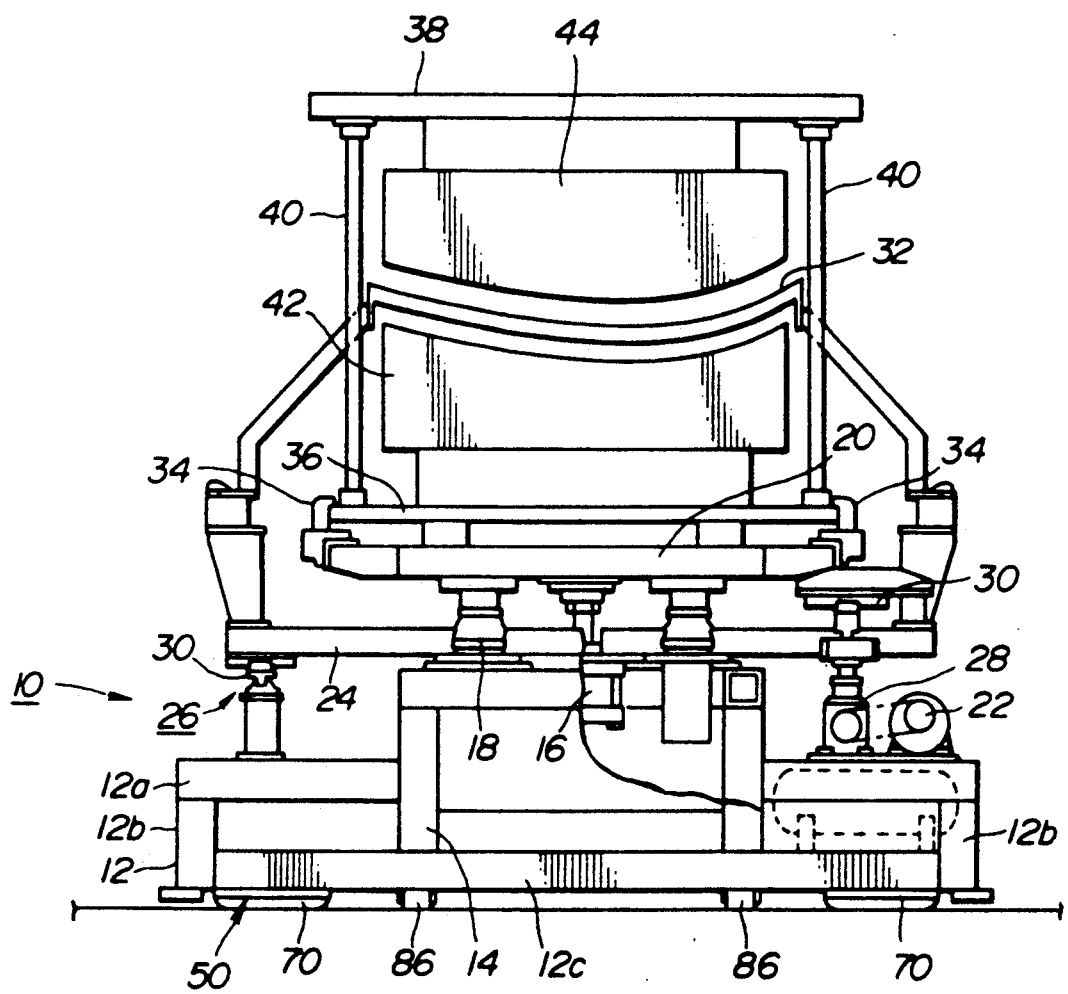
FIG. 1 is a front elevational view of a floating carriage according to the present invention, with molds supported respectively on attachment plates.
Figure 2:
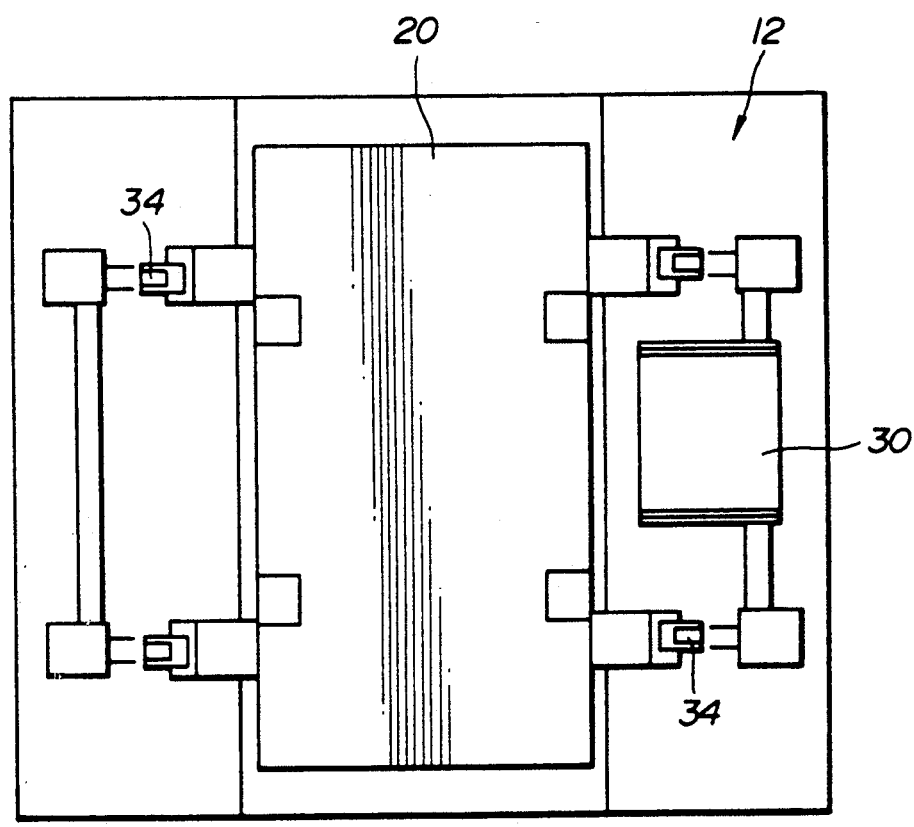
FIG. 2 is a plan view of the floating carriage.

As shown in FIGS. 1 and 2, a floating carriage 10 according to the present invention has a main frame 12 comprising an upper plate 12a which is substantially square in shape as viewed in plan, vertical plates 12b extending downwardly from opposite sides of the lower surface of the upper plate 12a, and a lower plate 12c extending between and joined to the lower ends of the vertical plates 12b. A central preassembled frame 14 is mounted centrally in the main frame 12 and projects upwardly above the upper surface of the upper plate 12a. A cylinder unit 16 is mounted as a lifting/lowering device on the central frame 14. The cylinder unit 16 serves to lift and lower a lower support base 20 while the latter is being guided by guide members 18. The upper plate 12a supports thereon a motor 22. Drive power from the motor 22 is transmitted to a support frame 24 via a speed reducer mechanism 28 and an oscillator mechanism 26 that includes a plurality of rails 30, for enabling the support frame 24 to make circular motion, elliptical motion, or rectilinear motion in a horizontal plane. The support frame 24 supports on its upper end a ring mold 32 for shaping the outer peripheral edge of a sheet of glass. The lower support base 20 has a plurality of clamps 34 on its side edges for reliably gripping a lower attachment plate 36. An upper attachment plate 38 is connected to the lower attachment plate 38 in vertically spaced relation by a plurality of vertical connecting rods 40. A lower mold 42 is mounted on the lower attachment plate 36, and an upper mold 44 is mounted on the upper attachment plate 38.

Figure 5A:
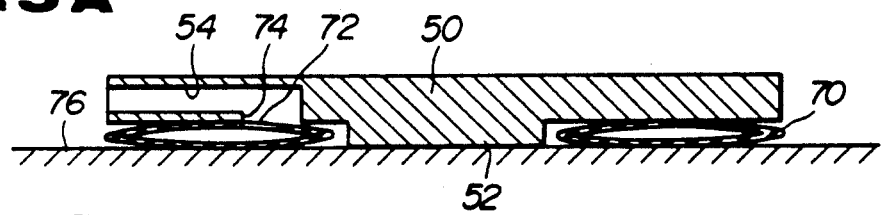
FIGS. 5A through 5C are cross-sectional views showing the manner in which the pallets are operated.
Figure 5B:
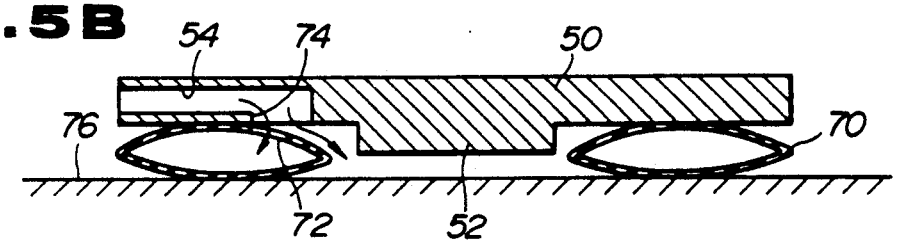
Figure 5C:
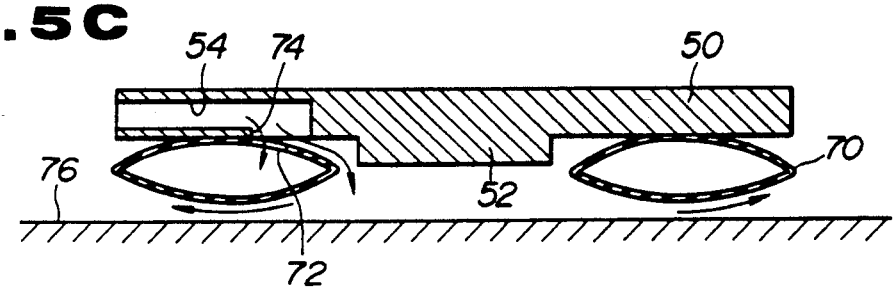

As shown in FIGS. 3, 4, and 5A through 5C, a plurality of pallets 50 are fixed to the lower surface of the lower plate 12c of the main frame 12. Each of the pallets 50 comprises a horizontal plate having a certain vertical thickness and a square shape as viewed in plan, and a cylindrical portion 52 projecting downwardly from the bottom thereof and normally resting on a floor 76. The pallet 50 has a flow passage 54 for passage of a fluid therethrough, the flow passage 54 being connected to a fluid source 56 through a hose 58 in a fluid supply system as shown in FIG. 4. Between the pallets 50 and the fluid source 56, there are connected a coupler 60, a pressure regulator 62, a valve 64, restrictions 66, and relief valves 68 for bleeding off fluid pressure in an emergency, these components making up the fluid supply system. The details of the fluid supply system will not be described as it has no direct bearing on the present invention. A hollow annular member 70 made of a resilient material is disposed around the cylindrical portion 52 and has an opening 72 defined below an outlet 74 at one end of the flow passage 54. When a fluid such as air under pressure is supplied from the fluid source 56 into the flow passage 54, the air is supplied into the annular member 70 of each of the pallets 50 through the opening 72, inflating the annular member 70 to slightly lift the cylindrical portion 72 off the floor 76, as shown in FIG. 5B. Continued supply of air under pressure into the annular member 70 spreads the gap between the outlet 74 and the annular member 70, thereby allowing part of the supplied air to flow through the gap toward the floor 76. As a result, a fluid layer or air layer is developed between the floor 76 and the bottom of the annular member 70 to lift the entire carriage 10, as shown in FIG. 5C. The coefficient of friction between the annular member 70 and the floor 76 is now reduced to a level ranging from 1/1000 to 3/1000 of that in the condition shown in FIG. 5A, i.e., prior to the floating of the entire carriage 10. Therefore, the carriage 10 can be moved with a very small force applied thereto.

Figure 6A:
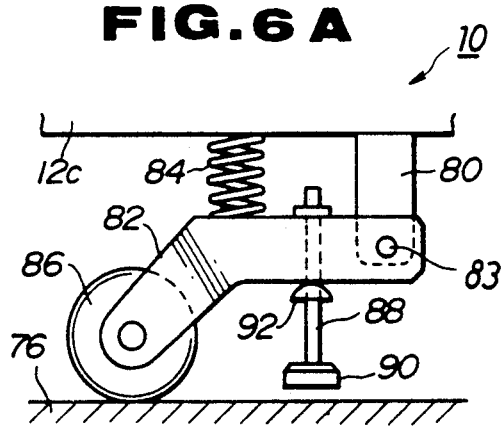
FIGS. 6A and 6B are views showing operation of a wheel attached to the floating carriage.
Figure 6B:
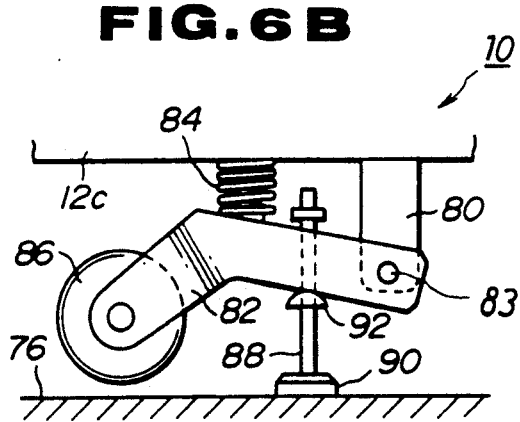

As illustrated in FIGS. 3 and 6A, 6B, brackets 80 are mounted on the lower surface of the lower plate 12c. An arm 82 is pivotally attached to the lower free end of each of the brackets 80. A compression spring 84 is disposed under compression between the arm 82 and the lower plate 12c for normally urging the arm 82 downwardly. When the carriage 10 floats above the floor 76 as shown in FIG. 6A, the arm 82 is pressed downwardly under the resiliency of the compression spring 84 to cause a wheel 86 rotatably mounted on the distal end of the arm 82 to contact the floor 76. A rod 88 extends vertically through the arm 82 and supports a rubber pad 90 on its lower end. A semispherical member 92 is fixed to an intermediate portion of the rod 88. When the carriage 10 is lowered onto the floor 76 as shown in FIG. 6B, the rubber pad 90 contacts the floor 76 and causes the arm 82 to swing upwardly about a pivot pin 83 of the bracket 80, thus lifting the wheel 86 off the floor 76.

FIG. 7 shows a frame assembly 96 of a shaping device disposed adjacent to a heating furnace 94. The frame assembly 96 comprises a plurality of vertical frames 96a and an upper horizontal plate 96b fixed to the upper ends of the vertical frames 96a. A cylinder unit 98 is disposed on the upper surface of the upper plate 96b and includes a rod 100 having a lower end coupled to a joint member of an upper support base 102 for vertically moving the upper support base 102. The upper support base 102 has a plurality of clamps 104 for reliably gripping the upper attachment plate 38 with the upper mold 44 mounted thereon.

Operation of the floating carriage 10 will be described below. A new upper mold is attached to the upper attachment plate 38 and a new lower mold is attached to the lower attachment plate 36. The lower mold is placed on the lower support base 20 by a suitable suspension device, and securely fixed to the lower support base 20 by the clamps 34. Then, the upper attachment plate 38 is lifted above the lower mold 42 by the same suspension device, and the upper and lower attachment plates 36, 38 are interconnected by the connecting rods 40. Now, air under pressure is supplied from the fluid source 56 into each of the annular members 70. The annular members 70 are inflated to lift the carriage 10 off the floor 76. The carriage 10 can thus be moved in its entirety to the frame assembly 96 by applying a relatively small force to the carriage 10. With the wheels 86 fixedly oriented to a certain direction, the carriage 10 is prevented from being displaced in other directions than said certain direction.

After the carriage 10 has been placed in the frame assembly 96, the cylinder unit 16 is actuated to elevate the lower support base 20 until the upper attachment plate 38 abuts against the upper support base 102. After the upper attachment plate 38 is held against the upper support base 102, the upper attachment plate 38 is fixed to the upper support base 102 by the clamps 104. Then, the cylinder unit 16 is operated to lower the lower support base 20, and the connecting rods 40 are removed. The carriage 10 is positioned in the frame assembly 96 at this time as shown in FIG. 8. A sheet of glass which has been heated to its softening point in the heating furnace 94 is received on feed rollers 106 on a receiver plate 108, installed on the carriage 10, after which the glass sheet is curved to a desired shape by the upper and lower molds 42, 44 and the ring mold 32 in the manner known in the art.

The aforesaid process is reversed for removing the molds 42, 44 from the frame assembly 96 and replacing them with new molds. More specifically, the cylinder unit 16 is operated to lift the lower support base 20, and the upper and lower attachment plates 36, 38 are coupled to each other by the connecting rods 40. The clamps 104 are swung outwardly to release the upper attachment plate 38 from the upper support base 102.

The cylinder unit 16 is operated again to lower the lower support base 20. The annular members 70 are supplied with air under pressure to float the carriage 10 off the floor, and the carriage 10 is moved to a mold storage area where a new set of upper and lower molds is stored.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

I claim:

1. A floating mold changer carriage for movement between a shaping device for shaping a sheet of glass with at least one mold and a mold storage area spaced from the shaping device, for replacing the mold with a new mold, said floating mold changer carriage comprising:

a main frame having a lower surface;

first means for connection to and fluid communication with a fluid source for discharging fluid supplied from the fluid source, downwardly from a lower surface of said main frame; and second means coacting with said first means and inflatable for floating said main frame when said second means is supplied with fluid therein;

plurality of wheels rotatably mounted on said main frame lower surface and oriented for controlling the direction of movement of the floating mold changer carriage; and said main frame having wheel supporting means extending downwardly from said lower surface for retractably supporting each of said wheels such that said wheel is spaced from the ground when said main frame is lowered from its floating state to be placed in a predetermined position, said wheel supporting means including a stationary support which engages the ground upon lowering said main frame and which acts to lift said wheels.

2. A floating mold changer carriage according to claim 1, wherein said first means comprises a plurality of pallets attached to the lower surface of said main frame, each of said pallets having a flow passage defined therein and having one open end for connection to the fluid source and the other open end opening toward a floor.

3. A floating mold changer carriage according to claim 2, wherein each of said pallets has a central cylindrical portion, said second means comprising hollow annular members disposed around the central cylindrical portions of said pallets, each of said annular members having an opening confronting said other open end of said flow passage.

4. A floating mold changer carriage according to claim 3, wherein said annular member is made of a resilient material.

5. A floating mold changer carrier according to claim 1, wherein said wheels are pivotally supported by said wheel supporting means.

6. A floating mold changer carrier according to claim 1, wherein said wheel supporting means includes a first linkage attached to said lower surface of said main frame, and a second linkage pivotally attached to said first linkage, said second linkage rotatably supporting said wheels such that said wheels are in contact with the ground when said main frame is in a floating state, said stationary support attached to said second linkage such that said stationary support engages the ground upon lowering said main frame and acts to lift said wheels.

* * * * *